No. 680,183. Patented Aug. 6, 1901.
G. M. TILGHMAN.
BARREL.
(Application filed May 22, 1901.)
(No Model.)

WITNESSES:
Fred D. Bradford
Perry B. Turpin

INVENTOR
G. M. Tilghman
BY Munn & Co.
ATTORNEYS

United States Patent Office.

GRANVILLE MYRES TILGHMAN, OF WEST NORFOLK, VIRGINIA.

BARREL.

SPECIFICATION forming part of Letters Patent No. 680,183, dated August 6, 1901.

Application filed May 22, 1901. Serial No. 61,390. (No model.)

*To all whom it may concern:*

Be it known that I, GRANVILLE MYRES TILGHMAN, residing at West Norfolk, in the county of Norfolk and State of Virginia, have made certain new and useful Improvements in Barrels, of which the following is a specification.

My invention is an improvement in barrels and like packages, and especially in that class of such devices intended for use in the shipment of garden truck and the like in which ventilation of the package is desired; and the invention consists in certain novel constructions and combinations of parts, as will be hereinafter described and claimed.

Figure 1:
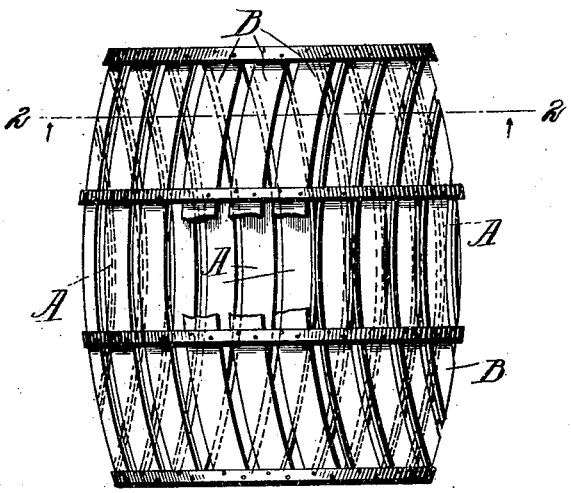
Figure 3:
Figure 4:
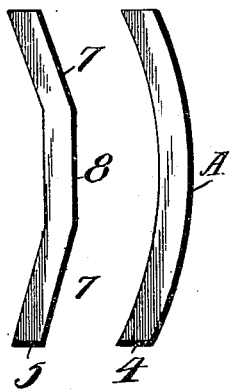
Figure 2:
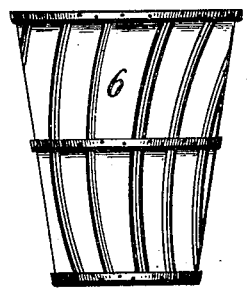
Figure 6:

In the drawings, Figure 1 is an elevation, partly broken away, of a barrel embodying my invention. Fig. 2 is a partial cross-section of a barrel on about line 2 2 of Fig. 1. Fig. 3 is a side view of a basket, showing a somewhat-different construction of stave. Fig. 4 is a detail side view of one of the staves of the barrel shown in Fig. 1. Fig. 5 is a side view showing a somewhat-different form of stave from that shown in Figs. 1 and 4, and Fig. 6 is a detail side view of one of the staves shown in the basket-package shown in Fig. 3.

The broad idea of my invention comprehends a stave for use in barrels and like packages, such as baskets, as shown in Fig. 3, which stave is deflected between its ends in the direction of its plane. This idea is carried out in the constructions shown in Figs. 4, 5, and 6, in all of which it will be noticed the ends of the staves are cut at right angles to the length thereof and parallel with each other, as shown at 4, 5, and 6, while the stave between its ends is deflected in the direction of its plane. In Figs. 4 and 5 the width of the stave is uniform throughout their lengths, these forms being designed for use in a barrel or other package of the same diameter at both ends. In Fig. 6, however, the stave is wider at its upper end and gradually decreases in width toward its lower end, so it is adapted for use in a basket-package, which tapers toward its lower end, as shown in Fig. 3. This stave (shown in Fig. 6) has its side edges formed on curved lines extending in continuous curves from end to end of the stave, and the stave shown in Fig. 4 and in Fig. 1 also has its side edges formed on curved lines, which extend from end to end and are parallel or concentric, the stave in Fig. 4 being of the same width throughout its length. In Fig. 5 the sides of the stave are formed on straight lines and in three sections, the end sections 7 combining with the intermediate section 8 to form the stave in the shape shown. When the staves are assembled to form the packages, such as shown in Figs. 1 and 3, it will be noticed that they stand with their opposite ends approximately opposite each other in the direction of length of the package, while their intermediate portions are deflected in the direction of the planes of the staves and of the circumference of the package. It may be preferred in the form of package shown in Fig. 1 to construct it with two series of staves A and B, the inner series being arranged within and closely against the outer series, and the staves of the inner and outer series being deflected in reverse directions.

In the manufacture of barrels it is found difficult or awkward to construct barrels with staves or splints crossing one another diagonally from the fact of having to place a straight stave or splint diagonally on a curved surface. By my invention I avoid the placing of a straight stave diagonally by deflecting the staves between their ends. By this means packages can be made, as shown in Figs. 1 and 3, in such manner as to obtain the diagonal bracing in either or both directions and at the same time arrange the ends of the staves opposite each other in the direction of length of the barrel or package, thus making the construction simpler and more economical to manufacture.

In constructing the package with two rows or series of staves, as shown in Fig. 1, the ventilation can be adjusted either by increasing or decreasing the angle or curve of the staves or by placing the first stave of the second row so as to secure the openings wherever desired.

Having thus described my invention, what I claim as new, and desire to secure by Letters Patent, is—

1. The barrel or like package substantially as herein described, consisting of the inner and outer series of staves reversely arranged and each stave being formed with its ends square and parallel with each other and between its ends with its side edges curved from end to end on continuous curves, all substantially as described whereby the ends of the staves will be approximately opposite each other in the direction of length of the package and such staves will be deflected between their ends in the direction of their planes and in the direction of the circumference of the package substantially as and for the purposes set forth.

2. A barrel or like package formed with staves whose ends are opposite each other in the direction of length of the package and which are deflected between their said ends in the direction of the circumference of the package substantially as set forth.

3. A stave for barrels or like packages which is deflected between its ends in the direction of its plane whereby the staves can be arranged in a package with their ends opposite each other in the direction of length of the package, and their intermediate portions will be deflected at one edge outward in the direction of the circumference of the package substantially as set forth.

4. A barrel or like package composed of inner and outer series of staves which are deflected laterally between their ends in the direction of the circumference of the package and spaced apart, the direction of deflection of the inner and outer series being reversed substantially as set forth.

5. A stave substantially as herein described comprising a single section, having its ends square and parallel with each other, and deflected between its ends in the direction of its plane.

6. A stave having its ends square and parallel with each other and having its side edges formed on curved lines extending between the said ends whereby the stave will be deflected between its ends in the direction of its plane substantially as set forth.

7. A barrel or like package having its staves formed with their intermediate portions deflected in one direction only circumferentially of the barrel with respect to a line drawn through the opposite ends of the stave substantially as set forth.

8. A stave for use in barrels and like packages, having its ends square and parallel with each other, and deflected in the plane of the stave laterally between its ends, with respect to a line dropped between said ends at right angles thereto and outward in the direction of the circumference of the package, substantially as set forth.

9. A barrel or like package, consisting of a circular series of staves, whose ends are square and parallel to each other, and which are deflected between their said ends laterally to lines drawn between their said ends at right angles thereto; whereby there will be produced a package whose staves stand with their opposite ends approximately opposite each other in the direction of the length of the package, while their intermediate portions are deflected in the direction of the planes of the staves and of the circumference of the package, substantially as shown and described.

10. A stave substantially as described, having its ends square and parallel with each other and having its side edges formed on uniform curves extending between the said ends, the opposite side edges of the stave being curved concentrically, substantially as and for the purposes set forth.

GRANVILLE MYRES TILGHMAN.

Witnesses:
F. B. PARROTT,
E. S. FRIEBUS.